Oct. 27, 1970  E. R. MICHALIK ET AL  3,536,463
METHOD AND APPARATUS FOR CONTROLLING TEMPORARY
STRESSES DURING THE FORMATION OF A GLASS
RIBBON FROM A MOLTEN POOL
Filed June 26, 1967  2 Sheets-Sheet 1
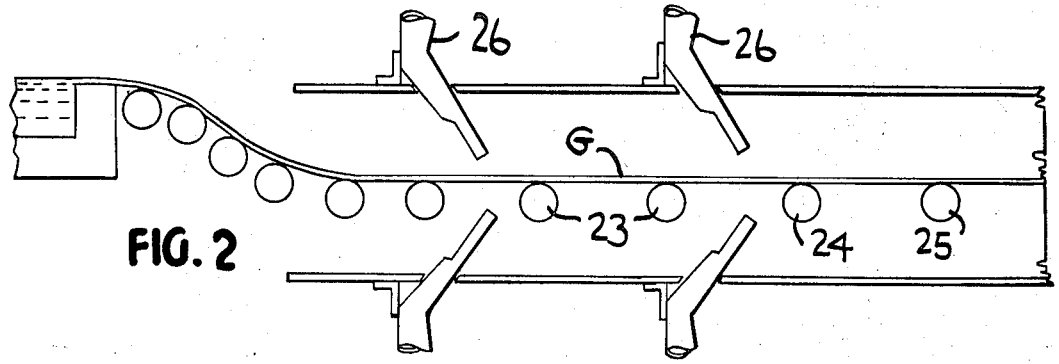
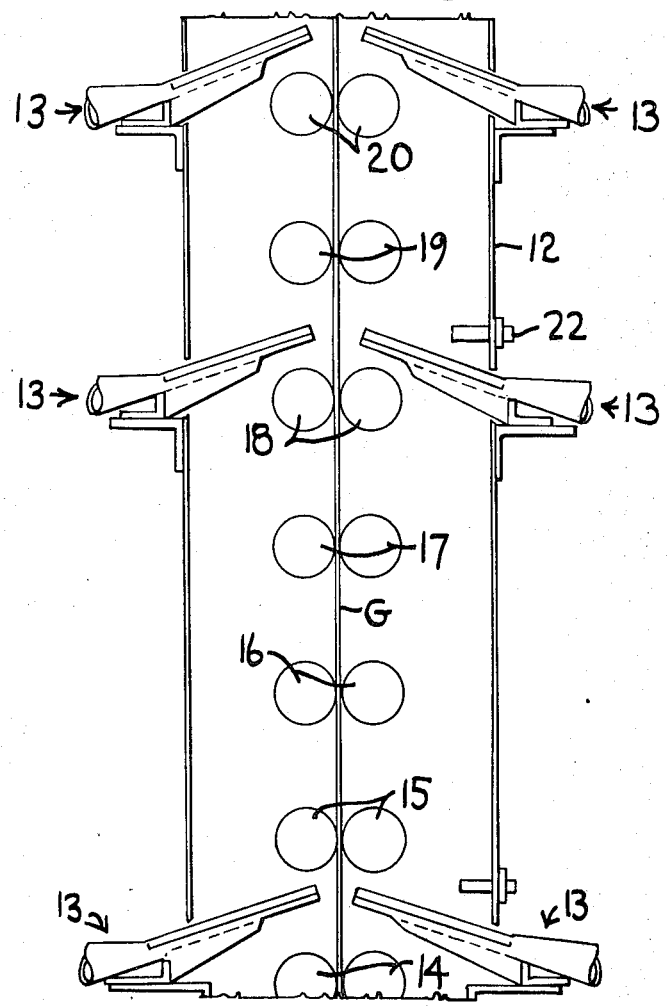
INVENTORS
EDMUND R. MICHALIK
ARTHUR C. SPENCER
BY Chisholm and Spencer
ATTORNEYS United States Patent Office 3,536,463
Patented Oct. 27, 1970

3,536,463
METHOD AND APPARATUS FOR CONTROLLING TEMPORARY STRESSES DURING THE FORMATION OF A GLASS RIBBON FROM A MOLTEN POOL
Edmund R. Michalik, West Mifflin, and Arthur C. Spencer, Pittsburgh, Pa., assignors to PPG Industries, Inc., a corporation of Pennsylvania
Filed June 26, 1967, Ser. No. 648,641
Int. Cl. C03b 13/00, 25/00
U.S. Cl. 65—95                      4 Claims

ABSTRACT OF THE DISCLOSURE

This is a method for controlling temporary surface stresses induced in a glass ribbon which is formed from a molten pool of glass in a window glass drawing machine or a plate glass forming lehr. A controlled environment of air is introduced and surrounds the major surfaces of the ribbon. The ribbon is cooled at or near an average linear rate from below its annealing range to ambient room temperature to control temporary surface stress development.

---

This invention relates to a method of controlling temporary surface stresses in a glass sheet during portions of thermal processing operations. Such operations include the production of glass from a pool of molten glass and drawing it vertically in a window glass drawing machine; and the production of plate glass from a pool of molten glass and withdrawing it horizontally between rolls to form a continuous ribbon of glass.

In both processes, the molten ribbon of glass is drawn away from a pool of glass and is permitted to cool. In the vertical process, the glass begins its cooling by exposure to surrounding room temperature air. In some vertical drawing operations an annealing procedure is performed between the molten pool and during the passage of the glass through the rolls wherein the residual tension of the glass is controlled by the annealing process. At the end of this process the glass passes from the controlled environment to an uncontrolled environment, and is then exposed to the surrounding atmosphere at room temperature. The path of travel in a glass drawing machine is formed by a series of parallel rolls which draw the glass upwardly from the tank containing molten glass. A typical drawing machine may have from 9 to 15 rolls and draw a ribbon of glass from 40 to 120 inches in width. A "capping" or cutting mechanism severs the glass and suitable lay-down apparatus positions the severed glass horizontally for further processing. Recent improvements in window glass drawing techniques permit an additional operation, such as annealing or other thermal treatment, during the drawing. The hot ribbon is permitted to cool to room temperature throughout the path of travel from the molten pool to the capping mechanism. When additional operations, such as annealing, are performed the ribbon is then allowed to cool from the end of the annealing operation to the severing operation by exposure to air at near room temperature.

In these glass forming operations, the glass while hot is exposed to room temperature air, which results in the development of high, but temporary, surface stresses. This invention provides a method and apparatus for reducing and eliminating this breakage by a controlled lowering of the glass surface temperature so that the excessive surface stress is not developed. In a window glass drawing machine, in addition to the surface stresses induced by the cooling, the glass passes between rolls and a mechanical stress may be created whenever there is a substantial differential in front surface to back surface temperatures. Both temporary stresses can then be limited to a preselected value by the proper application of the procedures of this invention.

In a plate glass forming operation, a ribbon of glass is drawn from a molten pool, formed between rolls, and carried along on conveyor rollers and permitted to cool to room temperature while conveyed. The path may be as long as 400 feet or more in length to permit the required gradual cooling of the ribbon. In a plate glass operation, as opposed to a drawing operation, there are no restraining rolls used and a component of stress resulting from any asymmetrical thermal gradient through the major surfaces is not known to be a factor in glass breakage. All other aspects of the development of temporary stresses due to thermal conditions that can cause breakage in the ribbon are present. In operations where annealing is not performed as part of the forming process, the ribbon treatment of this invention is begun when its temperature falls below its annealing range (about 930° F.) and is continued until the temperature of the ribbon surfaces is below 300° F. and then the cooling is continued to room temperature at a higher air velocity.

A full understanding of this invention may be acquired by referring to the description and accompanying drawings wherein:

FIG. 1 shows in schematic the upper sections of a typical drawing machine for manufacturing sheet glass from a molten glass pool.

FIG. 2 shows in schematic a lehr of a horizontal type which is used in the process of making sheets from either a plate or float glass type of operation.

Figure 3:
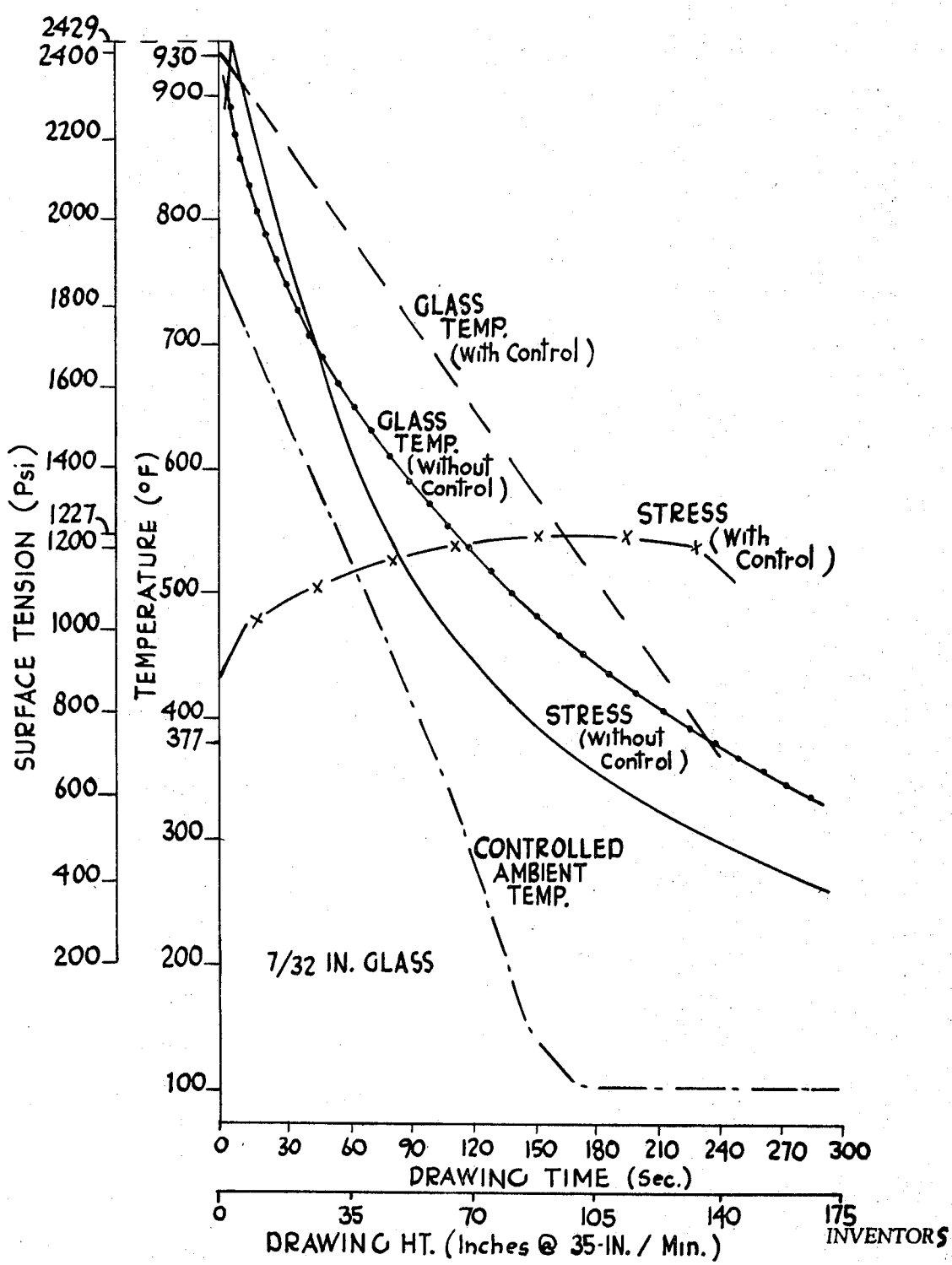
FIG. 3 is a graph showing relationships between temperature levels and temporary surface tensions.

This controlled cooling as applied to a typical drawing machine operation is described below. A ribbon of glass is formed from a molten pool and drawn upwardly between rolls. When the ribbon temperature falls below its annealing range (about 930° F. for soda-lime-silica glass) air is applied to the ribbon surfaces from suitable devices, such as ducts 13. Initially, the air is supplied at a temperature sufficient to provide ambient air at about 750° F. At a drawing height of 35 inches from the initial application of the controlled air, the temperature of the ambient air is about 525° F.; later in the drawing machine, at about 90 inches and 150 seconds, the ambient air is near 100° F.; and the ambient air temperature is then maintained at this point, however, with increased volume, until the capping apparatus is reached. To maintain the perferred temperature, a heat transfer coefficient (h) of about 3.7 B.t.u./hr./ft.²/° F. is required. To maintain the average cooling rate with an ambient temperature of about 100° F., the heat transfer rate increases to about 4.8 B.t.u./hr./ft.²/° F. and later to about 6.8 B.t.u./hr./ft.²/° F. In this process, to maintain the desired controlled ambient air temperature, warm air is added to the ribbon surfaces during the initial path of travel, when the ribbon temperature is about the lower limit of the annealing range, the temperature of the air supplied to the ribbon surfaces is gradually reduced so as to maintain near an average linear cooling rate down to below a ribbon temperature of about 300° F. then the volume of cooling air supplied is increased to provide an increase in heat transfer rate. On the practice of this method, the rate of heat emission from the ribbon is retarded initially by application of warm air to the ribbon environment and this rate of cooling is maintained so as to lower the ribbon temperature air range from about 930° F. to about 300° F. An uncontrolled natural cooling of the glass is at a higher rate during the initial period of cooling and at a decreasing rate during the subsequent or later portion of the cooling period. The natural cooling of the sheet is most rapid lower in the draw and decreases higher in the drawing apparatus. This is due to the temperature difference between the hot ribbon and the surrounding air, as this difference decreases the rate of cooling decreases. In this process, the temperature of the air supplied to the ribbon is gradually reduced so as to maintain a ribbon surface temperature at not substantially less than an average linear cooling rate. The ribbon must be cooled from near the lower limit of its annealing range to room temperature within the distance and time limitation imposed by the structure of the drawing machine, which is the distance between the region in the draw where the glass is below its annealing zone to the cut-off apparatus.

A typical uncontrolled cooling curve is shown in FIG. 3 as "Glass Temperature Without Control." The uncontrolled glass temperature versus time cooling curve shows a temperature drop which is faster than an average linear cooling rate from a ribbon temperature near the lower limit of its annealing range to a temperature below 300° F.

In FIG. 3 the line designated "Glass Temperature With Control" shows a desirable cooling rate which is ideally not less than an average linear cooling rate falling from a temperature in the lower limit of the annealing range to below 300° F. or thereabouts. The desirable ambient temperature to achieve this condition is that line designated as "Controlled Ambient Temperature." This average linear temperature is maintained in this example by the addition of warm air at about 125° F. to 150° F. below the ribbon surface temperature to retard the cooling of the glass until the glass is below 300° F. then to lower the desired ribbon temperature below 300° F. to room temperature the velocity of the air supply is increased to maintain a desirable coefficient of heat transfer. There is shown in FIG. 3 that the maximum temporary stress can be limited to near 1200 pounds per square inch.

Additional temporary stresses are developed in glass in a glass drawing machine as described below. Glass drawn between rolls is restrained between the parallel sets of rolls. Unequal temperature differences between the center and the surface will cause the glass to warp. This warp in the glass results in additional temporary surface stresses in the glass due to the resistance of the rolls to this warping. These temporary surface stresses are additive and can combine to break the glass during the drawing operation.

In a window glass operation, a ribbon of glass is formed from a molten pool of glass and drawn upwardly between rolls 14 through 20. An annealing or other conditioning process may be employed in the enclosure encompassing the roll 14 and below in the drawing machine. In a typical uncontrolled operation with 7/32 inch glass, the glass ribbon is at a surface temperature when leaving the annealing zone of about 930° F., at or near the lower limits of its annealing range, and is cooled to a temperature below 350° F. in approximately 300 seconds at a height of about 175 inches above the annealing zone. Temporary surface stress ranges from above 2400 to below 400 p.s.i. A typical drawing machine application of this method is shown in FIG. 3 wherein the ribbon is cooled at an average linear rate by applying warm air differing from the surface temperature by about 150° F. at points lower in the draw, and increasing to about 250° F. higher in the draw. The ambient air temperature ranges from about 750° F. to about 100° F. at the end of 160 seconds of drawing time.

As described above, a second source of temporary surface stress in a drawing machine is the mechanical restraint imposed on glass which is tending to warp because of a large temperature difference between major surfaces of the drawn sheet. This temporary stress can be controlled by maintaining a temperature difference between surfaces which is of such uniformity that the warping of the sheet and subsequent mechanical restraint of the rolls will induce stress within a range of selected values.

The simple sum of the stresses of both effects, i.e., the cooling rate in the machine direction of the ribbon and the front to back glass temperature differential can be kept below a desired preselected level.

The approximate surface stress due to cooling is given by $$\sigma_x = \frac{\alpha E}{6(1-\nu)} \cdot \frac{F_o W}{K} \quad (1)$$

where $\alpha$ is coefficient of expansion (in reciprocal °F.). E is Young's modulus for glass (in pounds/in.$^2$), $F_0$ is heat flux (in B.t.u./ft.$^2$ sec.), W is thickness of glass (in ft.), $\nu$ is Poisson's ratio and K is conductivity (in B.t.u./ft. sec. °F.). The heat flux can be written in terms of temperature difference between initial and final time as $$F_o = \rho C W \frac{[T_f - T_i]}{\alpha t} \quad (2)$$

where $\rho$ is density, C is specific heat, W is thickness, $T_f$ is final temperature, $T_i$ is initial temperature and $t$ is time.

For example if $T_i = 930°$ F., $T_f = 350°$ F., $t = 240$ sec. and W = 7/384 ft., then $$F_0 \sim .80 \text{ B.t.u./ft.}^2 \text{ sec.}$$

and $$\sigma_x = 1250 \text{ lb./in.}^2 \text{ (p.s.i.)}$$

The stress due to asymmetry in front to back temperature difference is given by $$\sigma_y = \frac{\alpha E}{2(1-\nu)} \cdot \Delta T \quad (3)$$

where $\Delta T$ is front to back temperature difference. Assuming additivity of stress such that $\sigma_x + \sigma_y = 2000$, the $\sigma_y = 750$ and substituting in the above solving for $\Delta T$, $\Delta T = 22°$ F. where $$\frac{\alpha E}{1-\nu} = 68 \text{ p.s.i./°F.}$$

Thus to maintain less than 2000 p.s.i. stress, the flux (cooling) should not exceed 0.80 B.t.u./ft.$^2$ sec. and the front to back temperature asymmetry should not exceed 22° F.

It is possible to determine the temperature of the fluid for the heat transfer characteristics required to obtain any cooling flux as a funcion of time, initial temperature and final temperature. This cooling flux then determines the stress level from Equation 1. The expression used to determine the fluid temperature and heat transfer coefficient is:

$$R\left[\left(\frac{Ts}{1000}\right)^4 - \left(\frac{Ta}{1000}\right)^4\right] + h(Ts - Ta) = -F_o \quad (4)$$

where $Ts$ is surface temperature, $Ta$ is fluid temperature, $Rs = \epsilon J \times 10^{12}$, where $\epsilon$ is emissivity, J = Steffan-Boltzman constant. The method would go something like this. A value for $Ts$ and $h$ is chosen and a value for $Ta$ is calculated from (4). Since the schedule involves a series of step changes in the cooling conditions, approximations to the value of $Ts$ can be obtained from transient heat transfer calculations involving discrete schedule changes.

APPARATUS

Apparatus such as jets or slots can be installed in a drawing machine or in a horizontal lehr to permit the practice of the process. Jets, or other sources of air which are designed to control both the volume of air as well as the temperature are arrayed along the sides and parallel to the surface of the sheets as they are coming from the annealing lehr or in the case of the drawing machine, parallel to the sheet. The apparatus is a double bank or row of jets with either slots or circular orifices installed between each set of drawing rolls. In practice the sheet in a typical drawing machine operation has a temperature profile which is non-uniform across the sheet in any given transverse section. At the edge of the sheet there is a greater cooling effect than at the center, hence, usually the center has a higher temperature than the edge of the same transverse cross section. To apply the controlled cooling schedule to a sheet most effectively, there should be at least a three-zone control across the sheet and front to back control through the sheet, and preferably at least 5 to 7 cooling zones across the sheet. Hence, longitudinal zones of the advancing ribbon can be individually controlled during the cooling schedule. Temperatures in all zones are lowered at an average linear rate, however, the temperatures of adjacent zones are regulated relative to other zones. This regulated zoning maintains a desirable horizontal temperature profile across the sheet. For example, the air supplied to the edge zones will be at higher temperature than air supplied to zones inwardly from the edge, this is to maintain the several zones at temperatures which establish a limited temperature differences between zones across the sheet. In this example a preferred temperature difference would be not greater than 60° F. between the center and edge zone temperatures. A typical drawing machine has approximately five to eight sets of rolls disposed on both major surfaces of the glass sheets.

ENCLOSED DRAWING MACHINE

The upper portion of drawing machines now in operation are exposed to ambient air at room temperatures. The ribbon of glass is drawn upwardly between rolls, as shown in FIG. 1 and this exposed condition permits the ribbon to be affected by any stray air currents or stream which may be the result of localized air currents in the plant or manufacturing building. These streams cause localized thermal gradients in the glass and result in random thermal stresses across the sheet. These random stresses cause localized differences in the physical characteristic of the sheet, and when they are superimposed on the described stresses resulting from the drawing operation, provide weak points in the glass where breakage is most likely to occur. The drawing machine is completely closed by panels to form a stable air environment about the sheet as it is drawn upwardly. The apparatus for applying the controlled temperature air to the glass surface is enclosed within the covered area of the drawing machine. This enclosure of the upper portions of the drawing machine provides a stable environment. The provision of a stable environment and the resulting elimination of stray currents from the environment of the ribbon, provides a base for the imposition of the controlled schedule for lowering the surface of the ribbon from below the annealing range to room temperature.

The path of the drawing machine is enclosed by walls 12 with temperature measuring devices 22 inserted at spaced intervals. This enclosed drawing machine eliminates glass contact with the random currents which result in variations in sheet temporary surface stresses. These variations result in non-uniform surface stresses. When these surface stresses are then superimposed upon the stress resulting when the ribbon passes from the hot molten pool to the surrounding environment, the resulting irregular and non-uniform stresses contribute to the increase in the breakage during the drawing of the ribbon. The enclosure of the upper portion of the drawing machine provides an apparatus for the most efficient application of the method of this invention, and also provides an environment which reduces glass contact with the random currents.

This method is very practical for reducing temporary surface stresses inducted in a ribbon of glass formed from a molten pool of glass in any plate glass forming operation.

FIG. 2 shows a schematic view of a horizontal plate glass froming operation. A ribbon of glass is formed from a molten pool and drawn off onto a horizontal path of travel, usually a roller conveyor. Most operations have an annealing zone in the path of travel.

This method of reduced cooling is applied to the ribbon when it is near the lower limit of its annealing range. In a manner similar to that described above in a drawing machine. No top restraining rolls are presently employed in this operation, therefore, no temporary stress is developed by mechanical restrain of the rolls if there is a great temperature difference between the major surfaces.

The apparatus for applying the controlled cooling schedule may consist of a double bank of rows of jets or slots arrayed along both major surfaces of the ribbon. Initially warm air is supplied to the glass surfaces and subsequently over the path of travel the air supply becomes cooler until the coolest air is applied when the ribbon is near room temperature. The same zone control of the advancing ribbon is contemplated as described under the sheet drawing machine.

As described above, the reduction in surface temperature of the glass from below its annealing range to near 300° F. not substantially below an average linear cooling rate controls temporary surface stresses which result in breakage of glass during the described operations.

The method claimed herein is practical for both a sheet drawing and a plate glass forming operation. Suitable apparatus is described for applying the cooling schedule. The enclosed upper region of the drawing machine provides a stable environment which eliminates stray air currents from contact with the ribbon, and also provide a suitable environment for the imposition of the controlled cooling schedule to reduce breakage by controlling temporary surface stresses.

What we claim is:

1. A method of forming a continuous flat ribbon of glass and of controlling the temporary surface stresses therein during the formation of said ribbon comprising:
   withdrawing glass from a molten bath thereof in the form of a continuous ribbon,
   cooling said glass ribbon after the formation thereof until the temperature of opposing surfaces of each increment of the ribbon extending transversely between the opposing edges of the ribbon is at about the bottom of the annealing temperature range of said glass,
   moving said continuous ribbon, as said transversely extending cooled increments thereof are progressively formed at substantially constant speed through a plurality of sequentially arranged contiguous cooling zones until the temperature of the opposing surfaces of each said incremental portion of the ribbon is lowered to about 300° F.,
   applying a gaseous cooling medium to the opposing surfaces of each progressively formed transversely extending increment as said increments pass through said sequentially arranged cooling zones,
   maintaining the temperature of said cooling medium and applying said medium to said ribbon at rates and in amounts sufficient to cool said surfaces of said increments of said ribbon at an average substantially linear cooling rate until the temperature of the opposing surfaces of each said progressively formed increment is about 300° F. and temporary surface stresses in said ribbon are reduced, and
   thereater applying a gaseous cooling medium to said opposing surfaces of each said progressively formed increment at temperatures, rates and in amounts sufficient to cool each said increment of said ribbon to room temperature.

2. The method of claim 1 wherein said gaseous cooling medium is maintained in each of said cooling zones at a temperature of from about 125° F. to about 150° F. below the surface temperature of the increment of said ribbon to which said medium is applied in each said cooling zone.

3. The method of claim 1 wherein the temperature of said cooling medium and the rates and amounts of said medium applied to said increments in each of said cooling zones are sufficient to limit the maximum temporary stress in the opposing surfaces of each increment orf said ribbon to up to about 1200 pounds per square inch.

4. The method of claim 1 wherein the cooling medium applied to the opposing surfaces of each said progressively formed increment is maintained at a temperature and is applied at a rate and in an amount sufficient to cool each said increment to room temperature and provide a total cooling time of each said increment of said ribbon which is substantially the same as that for natural convection cooling.

References Cited

UNITED STATES PATENTS

| | | | |
|---|---|---|---|
| 1,032,238 | 7/1912 | Player | 65—95 |
| 2,774,190 | 12/1956 | Atkeson | 65—95 |
| 2,952,097 | 9/1960 | Atkeson | 65—194 |
| 3,107,196 | 10/1963 | Acloque | 65—95 XR |
| 3,226,216 | 12/1965 | Oxley et al. | 65—95 |
| 3,226,217 | 12/1965 | Oxley et al. | 65—95 |
| 3,251,671 | 5/1966 | Gardon | 65—95 XR |
| 3,294,510 | 12/1966 | Bauduin | 65—195 XR |
| 3,301,650 | 1/1967 | Ward | 65—95 |
| 3,311,463 | 3/1967 | Atkeson | 65—95 XR |
| 3,318,673 | 5/1967 | Fuller et al. | 65—118 |

FRANK W. MIGA, Primary Examiner

U.S. Cl. X.R.

65—118, 119, 175, 194, 348